United States Patent
Ramakrishnan et al.

(10) Patent No.: US 9,510,319 B2
(45) Date of Patent: Nov. 29, 2016

(54) METHOD AND SYSTEM FOR LOCATION ESTIMATION

(71) Applicant: TEXAS INSTRUMENTS INCORPORATED, Dallas, TX (US)

(72) Inventors: Sthanunathan Ramakrishnan, Karnataka (IN); Sashidharan Venkatraman, Karnataka (IN); Ravi Krishna Bhat, Karnataka (IN); Jaiganesh Balakrishnan, Karnataka (IN); Saket Thukral, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 56 days.

(21) Appl. No.: 14/565,878

(22) Filed: Dec. 10, 2014

(65) Prior Publication Data

US 2016/0174185 A1  Jun. 16, 2016

(51) Int. Cl.
*H04W 64/00* (2009.01)

(52) U.S. Cl.
CPC .................. *H04W 64/006* (2013.01)

(58) Field of Classification Search
CPC ... H04W 64/00; H04W 4/02; H04W 64/006; H04L 29/08657; G01S 5/02; G01S 5/0252
USPC .............................. 455/456.1–457
See application file for complete search history.

(56) References Cited

U.S. PATENT DOCUMENTS

| | | | | |
|---|---|---|---|---|
| 7,127,258 B2 * | 10/2006 | Zegelin | ................ | H04W 48/20 370/328 |
| 7,653,400 B2 * | 1/2010 | Robertson | ........... | H04W 64/006 342/457 |
| 7,881,671 B2 * | 2/2011 | Sayeed | ................ | H04W 28/06 340/10.41 |
| 7,907,564 B2 * | 3/2011 | Laux | ..................... | H04W 24/00 370/329 |
| 8,478,297 B2 * | 7/2013 | Morgan | .................... | G01S 5/02 455/41.2 |
| 8,738,035 B1 * | 5/2014 | Ramakrishnan | ........ | G01S 19/48 342/451 |
| 8,965,398 B2 * | 2/2015 | Zhu | .............................. | 370/338 |
| 2005/0176406 A1 * | 8/2005 | Krishnakumar | .......... | G01S 5/02 455/410 |
| 2011/0235623 A1 * | 9/2011 | Alizadeh-Shabdiz | | G01S 5/0278 370/338 |
| 2011/0286437 A1 * | 11/2011 | Austin | .................... | H04W 4/02 370/338 |
| 2013/0090106 A1 * | 4/2013 | Mathews | ................ | H04W 4/06 455/418 |
| 2013/0190018 A1 * | 7/2013 | Mathews | .............. | H04W 4/023 455/456.6 |
| 2013/0337847 A1 * | 12/2013 | Sridhara | ................... | G01S 5/14 455/456.6 |
| 2014/0079043 A1 * | 3/2014 | Montemurro | ..... | H04W 52/0216 370/338 |
| 2014/0087752 A1 * | 3/2014 | Zhu | ........................ | H04W 24/00 455/456.1 |
| 2014/0094187 A1 * | 4/2014 | LaMarca | ............... | G01S 5/0236 455/456.1 |
| 2014/0274115 A1 * | 9/2014 | Michalson | ............ | H04W 4/028 455/456.1 |

(Continued)

*Primary Examiner* — Sharad Rampuria
(74) *Attorney, Agent, or Firm* — Lawrence J. Bassuk; Frank D. Cimino

(57) ABSTRACT

Several methods and systems for location estimation are disclosed. In an embodiment, the method includes performing a primary wireless scan to identify a first set of access points at a user location associated with a first user location estimate. A secondary wireless scan is performed at predefined time intervals subsequent to the primary wireless scan. A set of access points is identified corresponding to each secondary wireless scan. The method further comprises detecting a presence or an absence of user motion based on a number of shared access points between the first set of access points and a set of access points corresponding to each secondary wireless scan. A current user location is estimated to be the first user location estimate if the user motion is detected to be absent, or a second user location estimate computed based on geolocation signals if the user motion is detected to be present.

15 Claims, 6 Drawing Sheets

(56) References Cited

U.S. PATENT DOCUMENTS

2014/0287773 A1* 9/2014 Agerstam ............. H04W 48/16
                                              455/456.1
2015/0087239 A1* 3/2015 Yang ..................... H04W 64/00
                                              455/67.11
2015/0133148 A1* 5/2015 Yang ................. G06F 17/30289
                                              455/456.1
2015/0223045 A1* 8/2015 Sandblad .............. H04L 67/104
                                              370/338
2015/0289225 A1* 10/2015 Gao .................... H04W 64/003
                                              455/456.5

* cited by examiner

METHOD AND SYSTEM FOR LOCATION ESTIMATION

TECHNICAL FIELD

The present disclosure generally relates to the field of location estimation.

BACKGROUND

In recent times, handheld device applications, such as, for example, applications related to location based advertising, social networking, reminder services and the like, are driving the need for low power estimation of user's location. The handheld device applications are configured to be executed continuously at an application layer backend so as to monitor the user's locations and trigger specific actions at an application level upon the user's arrival at, and departure from, areas of interest. For example, such applications may recommend nearby shopping, eating and/or entertainment options or even provide notifications of friends who are currently in the area, upon estimating the user's location.

Pursuant to an exemplary scenario, satellite based navigation systems (e.g., Global Navigation Satellite Systems (GNSS)) with appropriate periodicity (e.g., an appropriate duty cycle) may be implemented to achieve periodic estimation of user location. The handheld device applications may utilize the GNSS location estimation to trigger specific actions at the application level. However, the GNSS sensing periodicity is both fixed and independent of user context. For example, even if the user is stationary or positioned in an environment having low mobility conditions for an extended period of time (for example, the user may be at home or in an office where there is limited mobility), the sensing periodicity is maintained. Given that GNSS location sensing consumes up to 20 milliamperes (mA) when 1-minute of periodicity is used, sizable amount of power could be consumed during such an exercise, which may be undesirable.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Various methods and systems for location estimation are disclosed. In an embodiment, a location estimation method includes performing a primary wireless scan to identify a first set of access points at a user location. The user location is associated with a first user location estimate. The location estimation method further includes performing a secondary wireless scan at pre-defined time intervals subsequent to the primary wireless scan, wherein a set of access points is identified corresponding to each secondary wireless scan, and wherein for each secondary wireless scan, a number of shared access points is identified and compared with a pre-defined threshold value. A shared access point is an access point identified to be present in the first set of access points and the set of access points corresponding to the secondary wireless scan. The location estimation method further includes detecting with a location estimation device, (1) a presence of user motion if the number of shared access points is less than or equal to the pre-defined threshold value for a pre-defined number of consecutive secondary wireless scans, or (2) an absence of the user motion from the user location if the number of shared access points is greater than the pre-defined threshold value for the pre-defined number of consecutive secondary wireless scans. The location estimation method further includes estimating current user location with the location estimation device, based on the first user location estimate if the absence of the user motion is detected, or a second user location estimate computed based on geolocation signals if the presence of the user motion is detected.

In an embodiment, a location estimation system is provided. The location estimation system includes a Wi-Fi module and a geolocation module. The Wi-Fi module includes a Wi-Fi scan module and a Wi-Fi motion detector communicatively associated with the Wi-Fi scan module. The Wi-Fi scan module is configured to perform a primary wireless scan to identify a first set of access points at a user location. The user location is associated with a first user location estimate. The Wi-Fi scan module is further configured to perform a secondary wireless scan at pre-defined time intervals subsequent to the primary wireless scan. A set of access points is identified corresponding to the each secondary wireless scan. The Wi-Fi motion detector is configured to identify a number of shared access points for each secondary wireless scan, where a shared access point is an access point identified to be present in the first set of access points and the set of access points corresponding to the secondary wireless scan. The Wi-Fi motion detector is further configured to compare the number of shared access points with a pre-defined threshold value to thereby identify (1) a presence of user motion if the number of shared access points is less than or equal to the pre-defined threshold value for a pre-defined number of consecutive secondary wireless scans, or (2) an absence of the user motion from the user location if the number of shared access points is greater than the pre-defined threshold value for the pre-defined number of consecutive secondary wireless scans. The geolocation module is communicatively associated with the Wi-Fi module and includes a geolocation determination module. The geolocation determination module is configured to estimate a current user location based on the first user location estimate if the absence of the user motion is detected, or, a second user location estimate computed based on geolocation signals if the presence of the user motion is detected.

Additionally, in an embodiment, a method for estimating a location of an object based on object motion detection is disclosed. In an embodiment, the method includes performing a primary wireless scan to identify a first set of access points at an object location. The object location is associated with a first object location estimate. The method further includes performing a secondary wireless scan at pre-defined time intervals from the primary wireless scan, wherein a set of access points is identified corresponding to each secondary wireless scan, and wherein for each secondary wireless scan, a number of shared access points is identified and compared with a pre-defined threshold value. A shared access point is an access point identified to be present in the first set of access points and the set of access points corresponding to the secondary wireless scan. The method further includes detecting with an electronic device, (1) a presence of object motion if the number of shared access points is less than or equal to the pre-defined threshold value for a pre-defined number of consecutive secondary wireless scans, or (2) an absence of the object motion from the object location if the number of shared access points is greater than the pre-defined threshold value for the pre-defined number of consecutive secondary wireless scans.

Other aspects and example embodiments are provided in the drawings and the detailed description that follows.

The drawings referred to in this description are not to be understood as being drawn to scale except if specifically noted, and such drawings are only exemplary in nature.

DETAILED DESCRIPTION

Many handheld device applications, such as, for example, applications related to like location based advertising, social networking, reminder services and the like, are driving the need for low power estimation of user's location. The handheld device applications are configured to be executed continuously at the application layer backend so as to monitor the user's locations and trigger specific actions at an application level upon the user's arrival at, and departure from, areas of interest. Pursuant to an example scenario, satellite based navigation systems (e.g., Global Navigation Satellite Systems (GNSS)) with appropriate periodicity (e.g., an appropriate duty cycle) may be implemented to achieve periodic estimation of user location. For example, the handheld device applications may utilize such GNSS location estimation to trigger specific actions at the application level. The periodic location estimation is further explained with reference to an example environment in FIG. 1.

Figure 1:
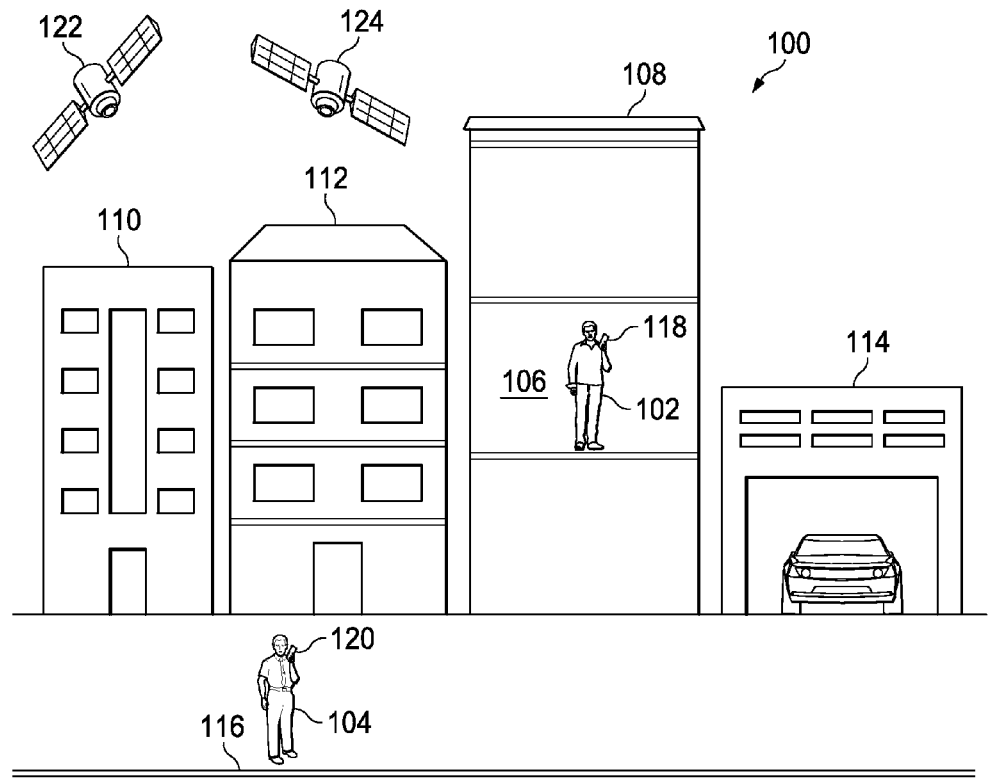
FIG. 1 depicts an example environment for illustrating periodic location estimation in accordance with an example scenario.

FIG. 1 depicts an example environment 100 for illustrating periodic location estimation in accordance with an example scenario. The environment 100 depicts a user 102 on a floor 106 of a multi-storied building 108. The multi-storied building 108 is depicted to be disposed among a plurality of buildings structures, such as building structures 110, 112, 114 and the like. The environment 100 further depicts another user 104 on a street 116 adjoining the plurality of building structures. Each user from among the users 102 and 104 is depicted to be associated with an electronic device. For example, the user 102 is depicted to be associated with an electronic device 118 and the user 104 is depicted to be associated with an electronic device 120. It is understood that the users 102 and 104 may be associated with one or more of such electronic devices. Examples of the electronic devices 118 and 120 may not only include handheld devices like mobile phones, Smartphones, laptops and tablet computers but may also include wearables or accessories like watches, pair of glasses and the like. The electronic devices 118 and 120 may include a number of applications, such as those related to location based advertising, social networking, reminder services and the like, which are configured to be executed continuously in the application backend so as to monitor a user's locations and trigger specific actions at an application level upon a user's arrival at, or, departure from, areas of interest.

In an exemplary scenario, the electronic devices 118 and 120 may be configured to communicate with satellite based navigation systems (e.g., Global Navigation Satellite Systems (GNSS)) with appropriate periodicity (e.g., duty cycle) for periodic estimation of user location. For example, the electronic devices 118 and 120 may sense and communicate with a plurality of satellites like satellites 122 and 124 for location estimation purposes. However, the sensing periodicity is both fixed and independent of user context. For example, even though the user 102 is on the floor 106 and accordingly is relatively stationary or is in a low mobility condition for an extended period of time, the sensing periodicity is maintained. Similarly, the sensing periodicity is maintained to be the same for the user 104, who is walking on the street 116. Given that GNSS location sensing consumes up to 20 milliamperes (mA) when 1-minute of periodicity is used, sizable amount of power could be consumed during such an exercise, which may be undesirable.

In certain exemplary scenarios, sensor based motion detection may be employed in the electronic devices, such as the electronic devices 118 and 120 for detecting user movement. For example, the electronic devices may include an accelerometer to detect user movement. A satellite based location estimation (also referred to hereinafter as satellite based positioning) may be triggered upon detection of user movement. For example, only when 'Acceleration>threshold', satellite based positioning is used for location estimation. An accelerometer typically consumes about 0.1 mA, thereby saving satellite sensing/computation power when user is completely stationary. However, sensors such as the accelerometer are associated with high sensitivity to minimal user movement and electronic device orientation changes. For example, a user moving within a cubicle in his/her office may trigger motion detection. Moreover, orientation changes can trigger motion detection due to gravity leakage. As a result, power saving in realistic scenarios is very limited due to the high sensitivity of such sensor based motion detectors. Furthermore, it is observed that motion detection is not triggered in some vehicular use cases, such as for example, in scenarios involving vehicles driving at constant velocity (for example, vehicles driving in cruise control mode).

In another exemplary scenario, location estimation may be implemented using wireless access points, which offers a low power alternative to satellite based positioning in many areas. More specifically, the wireless access point based location estimation (also referred to hereinafter as Wi-Fi based positioning) involves computing a user location based on wireless access points and their corresponding received signal strength indication (RSSI) or their time of flight (TOF) measurements. However, location estimation based on Wi-Fi based positioning is associated with several limitations. For example, location estimation using the Wi-Fi based positioning necessitates the prior knowledge of access point locations. However, obtaining the location co-ordinates of the access points (especially for indoor locations) for the Wi-Fi based positioning is difficult and cumbersome.

In typical indoor locations, there is no single vendor with access point database covering a large fraction of indoor areas. Moreover, in typical scenarios, in absence of Wi-Fi access point database residing in the user device, the Wi-Fi based positioning is implemented in various servers of private companies, which may require frequent host and web access, which significantly increases power consumption (for example, up to 100 s of mA).

Various embodiments of the present technology, however, provide methods and systems for low-power location estimation that are capable of overcoming these and other obstacles and providing additional benefits. Accordingly, Wi-Fi and satellite based positioning are collectively utilized in location estimation. More specifically, Wi-Fi scans are used to determine if the user has moved or not. This is then used to modulate a call to satellite location estimation. This decreases power consumption significantly in indoor pedestrian and stationary conditions. An example location estimation system is explained with reference to FIG. 2.

Figure 2:
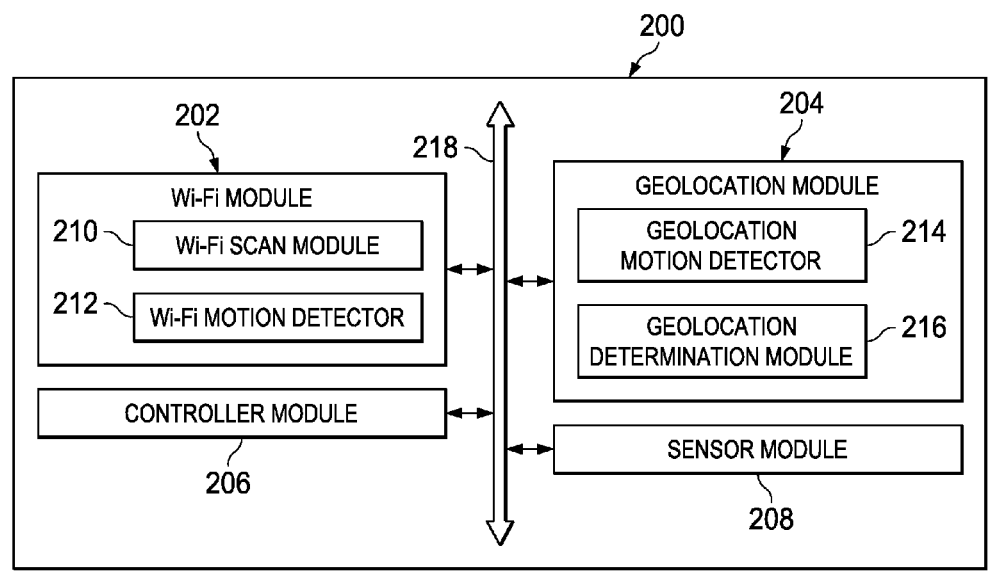
FIG. 2 is a simplified block diagram of an example location estimation system in accordance with an embodiment.

FIG. 2 is a simplified block diagram of an example location estimation system 200 (hereinafter referred to as system 200) in accordance with an embodiment. In FIG. 2, the system 200 is depicted to include a Wi-Fi module 202, a geolocation module 204, a controller module 206 and a sensor module 208. The Wi-Fi module 202 is depicted to include a Wi-Fi scan module 210 and a Wi-Fi motion detector 212. The geolocation module 204 is depicted to include a geolocation motion detector 214 and a geolocation determination module 216. The Wi-Fi module 202, the geolocation module 204, the controller module 206 and the sensor module 208 are communicatively associated with each other via bus 218. Examples of the bus 218 may include, but is not limited to, a data bus, a control bus and the like. The bus 218 may be, for example, a serial bus, a unidirectional bus or a bi-directional bus.

In accordance with an example implementation, the system 200 may be either a physical module (e.g., an integrated circuit chip or package) or a software module. In accordance with a second example implementation, however, the system 200 is a location estimation device (or location estimation machine) specifically configured to implement various embodiments of the present technology. In an embodiment, the system 200 may be included within an electronic device, such as the electronic devices 118 and 120 of FIG. 1. Accordingly, the system 200 may be included, wholly or in a distributed manner, within one of handheld devices like mobile phones, Smartphones, laptops and tablet computers and/or wearables or accessories like watches, pair of glasses and the like. In an example distributed implementation of the system 200, one or more components, such as the geolocation module 204 (including the geolocation motion detector 214 and the geolocation determination module 216) may be embedded within a host processor of a handheld device, whereas the Wi-Fi module 202 including the Wi-Fi scan module 210 and the Wi-Fi motion detector 212 may be implemented external to the host processor. The Wi-Fi module 202 and the geolocation module 204 may be in communication with each other and in conjunction with other components, such as the controller module 206 and the sensor module 208 together configure the system 200. In such a configuration, the Wi-Fi module 202 wakes up the host processor upon detection of user motion (the detection of user motion is explained later) thereby enabling the host processor to sleep for longer durations and save power. Upon waking of the host processor, the geolocation module 204 in the host processor is configured to compute the user location using geolocation signals to facilitate user location estimation. As noted above, all components of the system 200 may also be implemented wholly in a handheld device. The system 200 is configured to continuously run in the background and perform location estimation and provision location information to one or more applications, which may need such information for performing related tasks. Alternatively, the handheld device may be configured to facilitate a display of estimated location, for example on a digitized map of a geographical area on the display of the handheld device. It is noted that the system 200, in some example scenarios, may perform such location estimation irrespective of whether a user is actively seeking location information.

In an embodiment, various components of the system 200, such as the Wi-Fi module 202 and its components such as the Wi-Fi scan module 210 and the Wi-Fi motion detector 212, the geolocation module 204 and its components, such as the geolocation motion detector 214 and the geolocation determination module 216, the controller module 206, the sensor module 208 and the bus 218 may be implemented as hardware, software, firmware or any combination thereof. For example, one or more components of the system 200 may be embodied as a multi-core processor, a single-core processor, or a combination of one or more multi-core processors and one or more single-core processors. For example, one or more modules of the system 200 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, one or more components of the system 200 may be configured to execute hard-coded functionality. In an embodiment, the one or more components of the system 200 may be embodied as an executor of software instructions, wherein the instructions may specifically configure the system 200 to perform the algorithms and/or operations described herein when the instructions are executed. One or more modules of the system 200 may include, among other things, a clock, an arithmetic logic unit (ALU) and logic gates configured to support an operation of the system 200. In an embodiment, the system 200 is embodied at least partially in the form of the integrated circuit.

In an embodiment, the sensor module 208 may include one or more initial measurement unit (IMU) sensors such as a gyroscope (for sensing angular velocity), an accelerometer (for sensing acceleration) and the like. In some embodiments, the system 200 may include fewer or more number of components than those depicted in FIG. 2. For example, in some embodiments, the system 200 may preclude the sensor module 208. In such a case, the sensor module 208 may be included within the electronic device or may be external to the electronic device and may be communicatively associated with the system 200.

In an embodiment, the Wi-Fi scan module 210 may be embodied as a transceiver, which is configured to facilitate wireless access conforming to WLAN standards/specifications, such as the IEEE 802.11 a/b/c/g specifications. In some embodiments, the transceiver may be configured to conform to specifications for NFC communication, Bluetooth information exchange and/or Zigbee network access. In an embodiment, the Wi-Fi scan module 210 is configured to perform a primary wireless scan to identify a first set of access points at a user location. For example, if the user is located on floor 106 of the multi-storied building 108 of FIG. 1, then the Wi-Fi scan module 210 may perform the primary wireless scan to identify (1) one or more access points positioned in the floor 106 and (2) one or more access points positioned in the vicinity of the floor 106 (such as for example, one or more floors immediately above or below the floor 106 in the multi-storied building 108), which may together configure the first set of access points. The user location is associated with a first user location estimate. In an example scenario, the first user location estimate, such as a three-dimensional location estimate of the user on the floor 106 may have been previously computed, for example by using triangulation of geolocation signals received from three or more satellites (for example, signals received from GNSS satellites), and as such, the user location estimate of the user may already be known prior to performing the primary wireless scan. In an embodiment, the first user location estimate may be computed using the geolocation determination module 216 prior to performing of the primary wireless scan by the Wi-Fi scan module 210. In another embodiment, the first user location estimate may have been computed using Wi-Fi based positioning (for example, using RSSI or TOF measurements from nearby access points), prior to performing the primary wireless scan by the Wi-Fi scan module 210.

In an embodiment, the Wi-Fi scan module 210 is further configured to perform a secondary wireless scan at pre-defined time intervals from the primary wireless scan. A set of access points is identified corresponding to each secondary wireless scan. In an illustrative example, a pre-defined time interval may be chosen to be ten seconds. Accordingly, the Wi-Fi scan module 210 may be configured to perform a secondary wireless scan at every ten second interval (for example, at 10, 20, 30 seconds and so on and so forth) from the completion of the primary wireless scan. At each secondary wireless scan, the Wi-Fi scan module 210 identifies a set of access points. It is understood that the pre-defined time interval of ten seconds is included herein for illustration purposes and that the pre-defined time interval may be chosen to be any such time interval based on empirical data.

In an embodiment, the Wi-Fi motion detector module 212 is configured to detect a presence of one or more mobile access points. The term 'mobile access point' as used herein refers to a non-stationary access point identified to be present across one or more distant locations. For example, consider an access point deployed in a vehicle of the user. In a case when the user is traveling in the vehicle, the access point will be identified during each wireless scan performed from the vehicle, irrespective of a large change in user location. Such an access point is referred to herein as a mobile access point. In other example scenario, a user may be associated with one or more other electronic devices, which may function as an access point during various use cases. Such access points may be identified at various user locations and as such all such access points are referred to as mobile access points. In some cases, the access points that are observed to be persistent in each scan in spite of change in all previously identified access points may also provide an indication of the access points being mobile access points. In some example scenarios, the mobile access points may also be identified using satellite based positioning. For example, access points detected to be present at two different location estimates obtained using satellite based positioning may enable the identification of mobile access points. The Wi-Fi motion detector 212 is further configured to eliminate the one or more mobile access points from the first set of access points and the set of access points corresponding to each secondary wireless scan if the one or more mobile access points are detected to be present.

In an embodiment, the Wi-Fi motion detector 212 is configured to identify a presence of one or more duplicate entries in the first set of access points and the set of access points corresponding to each secondary wireless scan, respectively, by disregarding last nibble of media access control (MAC) identification (IDs) during access point identification. It is noted that a same physical access point may advertise multiple MAC IDs, which differ only in their last nibble (e.g. last group of alphanumeric characters from among a plurality of alphanumeric characters configuring MAC IDs). As a result, the Wi-Fi motion detector 212 may wrongly interpret a same physical access point as different access points and include the same physical access point multiple times during wireless scanning. Accordingly, the Wi-Fi motion detector 212 is configured to disregard the last nibble of the MAC IDs during wireless scanning, which may result in one or more duplicate entries in the first set of access points as well as in each set of access points identified during one or more secondary wireless scans. The Wi-Fi motion detector 212 may further be configured to coalesce the one or more duplicate entries in the first set of access points and the set of access points corresponding to each secondary wireless scan, respectively, if the one or more duplicate access points are identified to be present.

After each wireless scan (including the primary wireless scan and the secondary wireless scans), the Wi-Fi motion detector 212 is configured to eliminate any mobile access point found to be present as well as coalesce any duplicate entries therein. The Wi-Fi motion detector 212 is then configured to identify, for each secondary wireless scan, a number of shared access points between the first set of access points and a set of access points corresponding to each secondary wireless scan. The Wi-Fi motion detector 212 is further configured to compare the number of shared access points with a pre-defined threshold value. For example, if the first set of access points identified during the primary wireless scan includes access points A, B and C and if the set of access points in a secondary wireless scan includes access points B, C and D, then a number of access points identified to be shared (or common) is two (for example, access points B and C are identified to be common) and this number of shared access points is compared with a pre-defined threshold value. In an illustrative example, the pre-defined threshold value is chosen to be zero. Accordingly, the Wi-Fi motion detector 212 compares the number of shared access points, i.e. two in this case with the pre-defined threshold value (chosen to be zero) and stores the result of the comparison.

In an example scenario, the pre-defined threshold value may be chosen (for example, by the Wi-Fi motion detector 212) based on empirical data associated with various types of environment (for example, indoor environment, outdoor environment, rural environment, urban or semi-urban environment and the like). For example, in areas with high access point density, the pre-defined threshold value may be chosen to be a higher number (for example, two or greater than two), whereas an area with lower access point density, the pre-defined threshold value may be chosen to be a smaller number (for example, zero or one). In an embodiment, the pre-defined threshold value may be determined based on an expected number of mobile access points in the surrounding area.

In an embodiment, the Wi-Fi motion detector 212 is configured to detect: (1) a presence of user motion if the number of shared access points is less than or equal to the pre-defined threshold value for a pre-defined number of consecutive secondary wireless scans, or (2) an absence of the user motion from the user location if the number of shared access points is greater than the pre-defined threshold value for the pre-defined number of consecutive secondary wireless scans. As explained above, after each secondary wireless scan, a number of shared access points is compared with the pre-defined threshold value and the result of the comparison is stored by the Wi-Fi motion detector 212. If the result of the comparison corresponds to the number of shared access points being less than or equal to the pre-defined threshold value for 'm' number of consecutive secondary wireless scans, then the Wi-Fi motion detector 212 is configured to determine that the user has moved from the previously determined user location associated with the first user location estimate. The value of 'm' or the pre-defined number of consecutive secondary wireless scans may be chosen based on empirical data. In an illustrative example, the value of 'm' may be chosen to be five. It is noted that the value of 'm' may not be limited to five and any such number may be chosen for motion detection purposes. If the result of the comparison corresponds to the number of shared access points being greater than the pre-defined threshold value for 'm' consecutive secondary wireless scans, then the Wi-Fi motion detector 212 is configured to determine that the user has not moved from the previously determined user location associated with the first user location estimate. In an embodiment, the Wi-Fi module 202 may be configured to repeat the steps of performing the primary wireless scan and the secondary wireless scans, periodically, till the change in user location from the previously determined user location is observed. The detection of the change in the user location is further explained with reference to FIG. 3.

Figure 3:
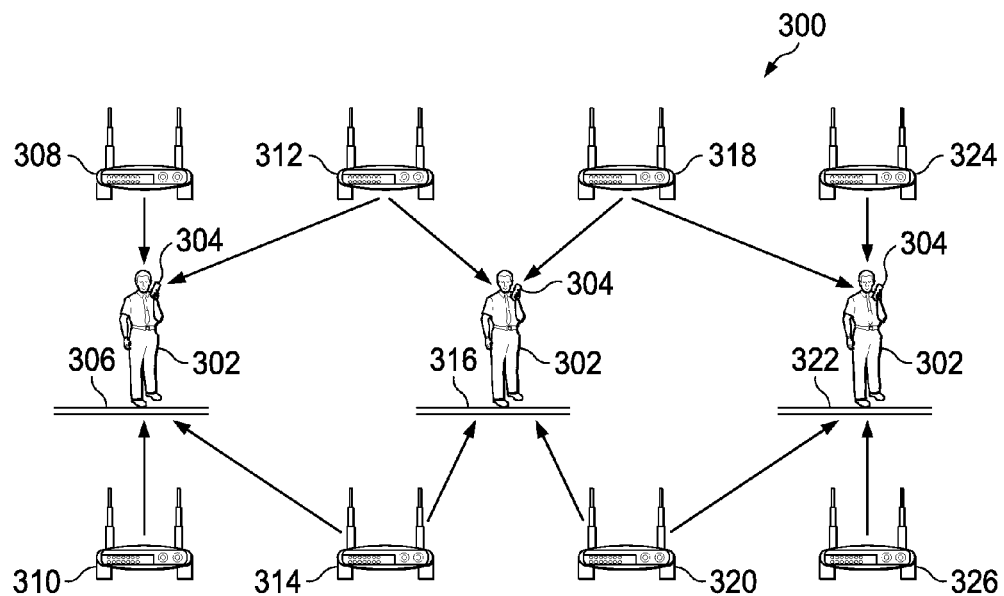
FIG. 3 depicts a schematic representation for illustrating example motion detection in accordance with an embodiment.

FIG. 3 depicts a schematic representation 300 for illustrating example motion detection in accordance with an embodiment. The motion detection, (e.g., detection of the user motion) may be performed by the Wi-Fi motion detector 212 of the system 200 as explained with reference to FIG. 2. The schematic representation 300 displays an example user 302 associated with an electronic device 304 including the system 200 (not shown in FIG. 3). The electronic device 304 may be embodied as one of a handheld device, such as a mobile phone, a Smartphone, a laptop and a tablet computer or even a wearable or an accessory, such as a watch or a pair of glasses.

As explained above with reference to FIG. 2, the Wi-Fi scan module 210 of the Wi-Fi module 202 performs a primary wireless scan at a user location to identify the first set of access points. Thereafter, the Wi-Fi scan module 210 performs a secondary wireless scan at pre-defined time intervals and the Wi-Fi motion detector 212 compares a number of shared access points with a pre-defined threshold value at each secondary wireless scan to detect the presence of user motion. Accordingly, in the schematic representation 300, the user 302 is depicted to be at first user location 306. A first user location estimate associated with the first user location 306 may be determined using the geolocation determination module 216 in the system 200. The Wi-Fi scan module 210 may perform a primary wireless scan at the first user location 306 to receive signals from access points 308, 310, 312 and 314. The access points 308, 310, 312 and 314 may accordingly be identified to configure the first set of access points. The Wi-Fi scan module 210 may perform a secondary wireless scan after a pre-defined time interval (for example, ten seconds) from the completion of the primary wireless scan. The user 302 may have moved to a second user location 316 in the time elapsed between the primary wireless scan and the secondary wireless scan. The Wi-Fi scan module 210 may identify a set of access points 312, 314, 318 and 320 at the second user location 316. The Wi-Fi motion detector 212 may compare the first set of access points and the set of access points corresponding to the second user location 316 to identify a number of shared access points. The Wi-Fi motion detector 212 may identify the number of shared access points to be two (for example, access points 312 and 314). The Wi-Fi motion detector 212 is further configured to compare the number of shared access points to a pre-defined threshold value. In the illustration depicted by the schematic representation 300, the pre-defined threshold value is chosen to be zero. It is understood that the value of the pre-defined threshold may be chosen based on a number of factors as explained with reference to FIG. 2. The number of shared access points, i.e. two in this case, is compared with the pre-defined threshold value, i.e. zero and the result of the comparison (i.e. the number of shared access points is greater than the pre-defined threshold value) is stored by the Wi-Fi motion detector 212 of the system 200.

The Wi-Fi scan module 210 is further configured to perform another secondary wireless scan at a pre-defined interval (for example, ten seconds) from the completion of the earlier secondary wireless scan. The user 302 may have moved to a third user location 322 in the time elapsed between the earlier secondary wireless scan and the subsequent secondary wireless scan. The Wi-Fi scan module 210 may identify a set of access points 318, 320, 324 and 326 at the third user location 322. The Wi-Fi motion detector 212 may compare the first set of access points and the set of access points corresponding to the third user location 322 to identify a number of shared access points. The Wi-Fi motion detector 212 may identify the number of shared access points to be zero. The Wi-Fi motion detector 212 is further configured to compare the number of shared access points to the pre-defined threshold value (for example, the zero value). The number of shared access points, i.e. zero in this case, is compared with the pre-defined threshold value, i.e. zero and the result of the comparison (i.e. the number of shared access points is equal to the pre-defined threshold value) is stored by the Wi-Fi motion detector 212.

As explained with reference to FIG. 2, the Wi-Fi motion detector 212 is configured to detect: (1) a presence of user motion if the number of shared access points is less than or equal to the pre-defined threshold value for a pre-defined number of consecutive secondary wireless scans, or (2) an absence of the user motion from the user location if the number of shared access points is greater than the pre-defined threshold value for the pre-defined number of consecutive secondary wireless scans. In this illustrative example, the pre-defined number of consecutive secondary wireless scans is chosen to be one, or, more specifically the presence or absence of user motion is detected at every instant of wireless scanning. Accordingly, since the number of shared access points is greater than the pre-defined threshold value at the second user location 316, the Wi-Fi motion detector 212 detects an absence of user motion (or more specifically, absence of significant user motion). However, at the third user location 322, since the number of common access points is equal to the pre-defined threshold value, the Wi-Fi motion detector 212 detects the presence of user motion. In some example embodiments, such a technique of user motion detection based on access point visibility during successive wireless scans may be extended to other applications, such as for example, tracking of assets in a warehouse and the like. More specifically, the presence of goods (or objects) in a warehouse may be ascertained based on corresponding motion detection (or lack of motion therefrom) based on access point visibility during successive wireless scans as will be explained later with reference to FIG. 7.

Referring now to FIG. 2, in an embodiment, the Wi-Fi motion detector 212 is further configured to compute for each secondary wireless scan, a difference in received signal strength indication (RSSI) measurements between the first set of access points and a set of access points corresponding to the each secondary wireless scan to assist in detection of the user motion with finer resolution. For example, in addition to the number of shared access points, a difference in RSSI (or time of flight or TOF) measurements may be computed to assist in detection of user motion. For example, if an RSSI measurement received from an access point is observed to be decreasing over consecutive secondary wireless scans, then the Wi-Fi motion detector 212 may be configured to determine that the user is moving away from the access point and accordingly, user motion may be detected with greater granularity/resolution based on difference in RSSI measurements.

In an embodiment, the geolocation determination module 216 is configured to estimate a current user location based on: (1) the first user location estimate if the absence of user motion is detected, or (2) a second user location estimate computed based on geolocation signals if the presence of user motion is detected. More specifically, the geolocation determination module 216 is configured to propagate the initially computed first user location estimate if the absence of user motion is detected. Accordingly, a location of the user may be estimated to be user location associated with the first user location estimate. One or more applications in the electronic device associated with the system 200 may utilize the estimated location of the user for triggering one or more specific actions at an application level upon a user's arrival at, or, departure from, areas of interest. However, if the Wi-Fi motion detector 212 detects a presence of the user motion, then the geolocation determination module 216 may compute the second user location estimate based on geolocation signals received at the new user location. For example, if it is determined that the user has moved from the floor 106 to the street 116 depicted in the environment 100 in FIG. 1, then the geolocation determination module 216 is configured to compute the second user location estimate based on the geolocation signals received by the geolocation determination module 216 at the user location on the street 116.

In an embodiment, the controller module 206 is configured to detect if a difference between the second user location estimate and the first user location estimate (also referred to herein as the new user location estimate and the old user location estimate, respectively) is greater than a pre-defined distance threshold. In an embodiment, the controller module 206 is configured to detect subsequent user motion based on the difference between the second user location estimate and the first user location estimate. In an embodiment, the controller module 206 is configured to select one of the Wi-Fi motion detector 212 and the geolocation motion detector 214 for facilitating the subsequent user motion detection based on the detected difference. For example, if the difference between the second user location estimate and the first user location estimate is greater than the pre-defined distance threshold, implying that the user is moving with a higher velocity, then the controller module 206 is configured to select the geolocation motion detector 214 with associated periodicity to detect subsequent user motion. In an example embodiment, the periodicity associated with the geolocation motion detector 214 may be one-minute interval, implying a satellite scan every minute to receive geolocation signals from the satellites. The geolocation determination module 216 may then compute user locations at every minute and check for presence of user movement from the previously computed user location to detect subsequent user motion.

In an embodiment, if the difference between the second user location estimate and the first user location estimate is less than or equal to the pre-defined distance threshold, implying, that the user is either stationary or moving with a relatively lower velocity, then the controller module 206 is configured to select the Wi-Fi motion detector 212 with associated periodicity to detect subsequent user motion. In an example embodiment, the periodicity associated with the Wi-Fi motion detector 212 may be 15 seconds interval, implying a wireless scan every 15 seconds to receive Wi-Fi signals from nearby access points. The Wi-Fi motion detector 212 may then detect a presence of user movement from the previously computed user location. More specifically, the Wi-Fi motion detector 212 is configured to detect the subsequent user motion based on periodic repeating of the steps of performing the primary wireless scan and performing the secondary wireless scans by the Wi-Fi scan module 210. For example, the Wi-Fi scan module 210 is configured to perform the primary wireless scan and the secondary wireless scans, repeatedly, to identify respective set of access points and provision the result to the Wi-Fi motion detector 212 for comparison of a shared number of access points therebetween with a pre-defined threshold value to detect the subsequent user motion as explained with reference to FIG. 3. An example switching between the Wi-Fi motion detector 212 and the geolocation motion detector 214 for detecting subsequent user motion is further explained with reference to an illustrative example in FIG. 4.

Figure 4:
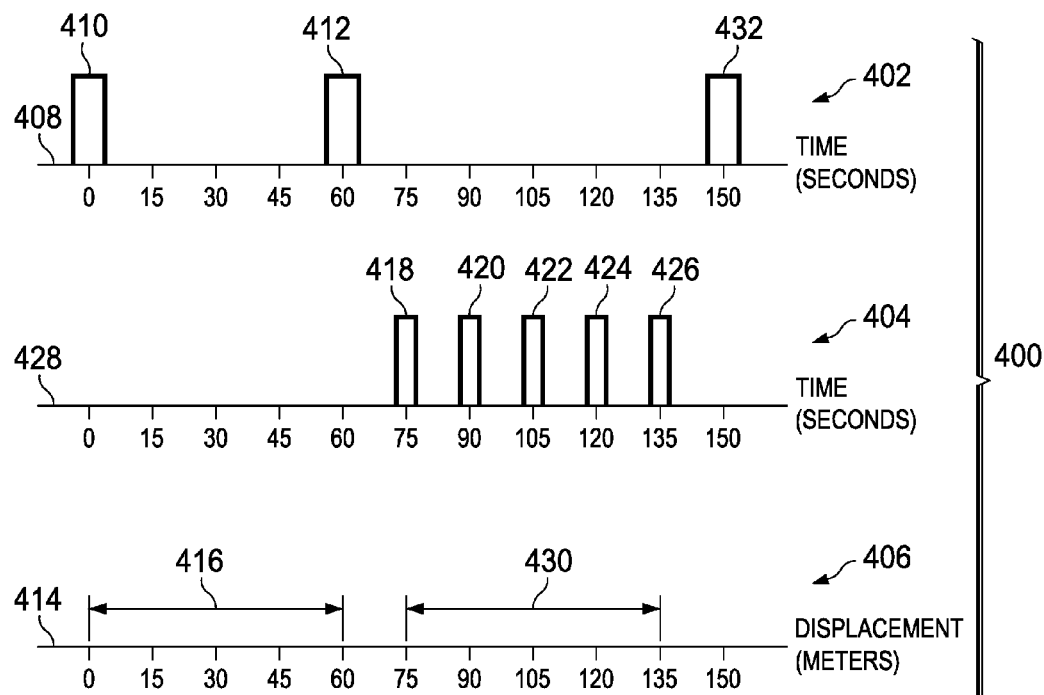
FIG. 4 depicts a plurality of charts associated with example motion detection in accordance with an embodiment.

FIG. 4 depicts a plurality of charts 400 associated with example motion detection in accordance with embodiment. More specifically, the plurality of charts 400 includes a first plot 402 depicting time intervals at which satellite scans are performed by the geolocation motion detector 214, a second plot 404 depicting the time intervals at which wireless scans are performed by the Wi-Fi scan module 210 and a third plot 406 depicting user displacement (in meters) during the time intervals corresponding to the first plot 402 and the second plot 404. The plurality of charts 400 is explained in further detail below:

The first plot 402 depicts a time line 408 on which time instants of the satellite scans are plotted. For example, a satellite scan 410 is depicted to be plotted on the time line 408 at the $0^{th}$ second time instant. It is understood that a time instant at which this initial satellite scan is performed may be considered to be the $0^{th}$ second time instant for this illustrative example. The geolocation motion detector 214 of the system 200 depicted in FIG. 2 may perform the satellite scan 410 at the $0^{th}$ second time instant for receiving geolocation signals corresponding to a current user location. A user location estimate may be computed based on the received geolocation signals by the geolocation determination module 216 of the system 200. The geolocation motion detector 214 may perform another satellite scan 412 at the $60^{th}$ second time instant (i.e. with a one minute periodicity). A corresponding displacement of a user associated with the system 200 is depicted to be 60 meters on the displacement axis 414 (as depicted by displacement 416) corresponding to the third plot 406 implying an average velocity estimate associated with the user movements between the $0^{th}$ second time instant and the $60^{th}$ second time instant to be 1 meter/second. A user location estimate is computed based on the received geolocation signals corresponding to the satellite scan 412 and a difference between the new location estimate and the user location estimate corresponding to the satellite scan 410 is compared with a pre-defined distance threshold. In this illustrative example, the pre-defined distance threshold is chosen (for example, by the controller module 206 of the system 200) to be 100 meters. Since the difference of 60 meters between the new user location estimate and the user location estimate corresponding to the satellite scan 410 is less than the pre-defined distance threshold of 100 meters, it is determined by the controller module 206 that the user is relatively stationery or in a low mobility condition. Accordingly, the controller module 206 is configured to switch the detection of subsequent user motion to the Wi-Fi motion detector 212. It is noted that if it was determined that the difference between the new location estimate and user location estimate corresponding to the satellite scan 410 is greater than the pre-defined distance threshold, then the controller module 206 would retain the use of geolocation motion detector 214 for detection of subsequent motion by continuing the satellite scanning at periodic one minute intervals.

Upon switching of the subsequent user motion detection to the Wi-Fi motion detector 212 by the controller module 206, the Wi-Fi scan module 210 of the system 200 is configured to perform wireless scans for access point identification at periodic intervals of 15 seconds as depicted by the wireless scans 418, 420, 422, 424 and 426 corresponding to the $75^{th}$, $90^{th}$, $105^{th}$, $120^{th}$ and $135^{th}$ second time instants on the time line 428 of the second plot 404. The wireless scan at the $75^{th}$ second time instant may be considered to be primary wireless scan and accordingly the new user location estimate computed at the satellite scan 412 may be considered as the first user location estimate for the current user location and access points identified in the vicinity of the current user location to be the first set of access points. The subsequent wireless scans at the $90^{th}$, $105^{th}$ and $120^{th}$ and $135^{th}$ second time instants correspond to the secondary wireless scans and accordingly access points identified at each of these time instants are compared with the access points identified during the primary wireless scan and a number of shared access points at each time instant may be compared to a pre-defined threshold value. If the number of shared access points is less than or equal to the pre-defined threshold value for a pre-defined number of consecutive secondary wireless scans, then the Wi-Fi motion detector 212 detects the presence of user motion. The detection of the absence of user motion or the presence of user motion may be performed as explained with reference to FIG. 3 and is not explained herein again. At the $135^{th}$ second time instant, the Wi-Fi motion detector 212 is depicted to have detected presence of user motion. The corresponding user displacement from the $75^{th}$ second time instant to the $135^{th}$ second time instant is depicted by displacement 430 on the displacement axis 414. Upon detection of the user motion, the controller module 206 is configured to switch to the geolocation motion detector 214, which performs the satellite scan 432 at the $150^{th}$ second time instant to receive the geolocation signals and the geolocation determination module 216 determines a current user location estimate. The controller module 206 is configured to compare the distance between this current user location estimate with the previous user location estimate (i.e. new user location estimate) and based on the comparison, select one of Wi-Fi motion detector 212 and the geolocation motion detector 214 for subsequent user motion detection as explained above.

Referring now to FIG. 2, in an embodiment, the geolocation motion detector 214 is further configured to determine an average velocity estimate associated with the subsequent user motion. For example, in the illustrative example explained with reference to FIG. 4, the geolocation motion detector 214 may detect the average velocity estimate associated with the user motion to be 1 meter/second. In an embodiment, a periodicity of one of the Wi-Fi motion detector 212 and the geolocation motion detector 214 is chosen based on the average velocity estimate. More specifically, the controller module 206 is configured to select the geolocation motion detector 214 at high average velocities associated with user motion (implying that the user is traveling in a vehicle or is in general high mobility condition), with a periodicity chosen to be proportional to the average velocity estimate. For example, if the user is in a vehicle and accordingly an average velocity estimate associated with the user motion is high, then a periodicity of the geolocation motion detector 214 may be chosen to be a higher value (for example, less than a minute periodicity for scanning of satellite signals). However, if the user is running or riding a bicycle, then a periodicity of the geolocation motion detector 214 may be chosen to be a lower value (for example, one minute periodicity for scanning of satellite signals). Similarly, a periodicity of the Wi-Fi motion detector 212 may be chosen to be a high value (for example, 15 seconds) or a lower value (for example, 5 to ten seconds) depending upon the average velocity estimate in the low mobility condition.

In an embodiment, the sensor module 208 of the system 200 is configured to provision sensor indications of user movement at the user location for triggering the performing of the primary wireless scan at the user location. An example sensor module 208 may include an accelerometer to detect user movement. The sensor module 208 is configured to provision an indication of user movement if the acceleration is greater than a preset threshold value. If the user motion is determined to be absent by the geolocation motion detector 214 or the Wi-Fi motion detector 212 and the user is deemed to be stationary, then the sensor indications of user movement may trigger the Wi-Fi scan module 210 of the system 200 to initiate the primary wireless scanning to identify the first set of access points. In an embodiment, upon the selection of the Wi-Fi motion detector 212 by the controller module 206 for user motion detection, the Wi-Fi scan module 210 may perform wireless scans at periodic intervals. However, in between these wireless scans, if indication of user movement is received from the sensor module 208, then the Wi-Fi scan module 210 may initiate the scanning process as explained with reference to FIG. 3 for detection of user motion. The sensor assisted wireless scanning for user motion detection enables the wireless scans to be performed with a higher periodicity thereby further improving a power consumption of the electronic device associated with the system 200. An example improvement in the power consumption on account of user motion detection based on Wi-Fi scanning as well as sensor assistance in triggering Wi-Fi scanning is depicted in Table 1 below:

TABLE 1

| User Scenario | Power Consumption in milliamperes (mA) | | |
| --- | --- | --- | --- |
| | Satellite based periodic location estimation | Wi-Fi and Satellite based location estimation | Sensor assisted Wi-Fi and Satellite based location estimation |
| Stationery | 20 | 1 | 0.1 |
| Outdoor fast walk (Average velocity = 1 meter/second) | 20 | 16.5 | 16.6 |
| Outdoor typical walk (Average velocity = 0.5 meter/second) | 20 | 13.0 | 13.1 |
| Indoor Pedestrian (Within Office/home) | 20 | 1 | 1.1 |
| Vehicular | 20 | 20 | 20.1 |

As depicted in table 1, the conventional satellite (GNSS) based periodic location estimation using one-minute periodicity scanning for satellite signals consumes 20 mA irrespective of user's location context. However, using Wi-Fi and satellite based location estimation (i.e. using Wi-Fi scans to determine if the user has moved or not and then modulating the call to geolocation module 204 based on user motion detection) as suggested in various embodiments herein provide significant power savings in both stationary and indoor scenarios as depicted in Table 1 above. The stationary and indoor scenario is historically the most dominant use case applicable to typical users for more than 60% of the time. Moreover, the sensor assisted Wi-Fi and satellite based location estimation provides a further improvement in power saving as depicted by the Table 1 above.

As explained, the system 200 may be included within a electronic device, such as a handheld device like a mobile phone, a Smartphone, a laptop and a tablet computer and/or wearable or an accessory like a watch, a pair of glasses and the like. The electronic device and/or the system 200 may include components for performing various functions, which are not depicted herein. For example, the electronic device and/or the system 200 may additionally include components, such as an input unit (e.g., a touch screen panel or a keyboard/keypad), a video display unit (e.g., liquid crystal display (LCD), a cathode ray tube (CRT), and the like), a cursor control device (e.g., a mouse), a drive unit (e.g., a disk drive), a signal generation unit (e.g., a speaker) and/or a network interface unit. The drive unit includes a machine-readable medium upon which is stored one or more sets of instructions (e.g., software) embodying one or more of the methodologies and/or functions described herein. In an embodiment, the software resides, either completely or partially, within the controller module 206, and/or within the Wi-Fi module 202 and the geolocation module 204 during the execution thereof by the system 200, such that the controller module 206, the Wi-Fi module 202 and the geolocation module 204 also constitute a machine-readable media. The software may further be transmitted and/or received over a network via the network interface unit. A location estimation method is explained with reference to FIG. 5.

Figure 5:
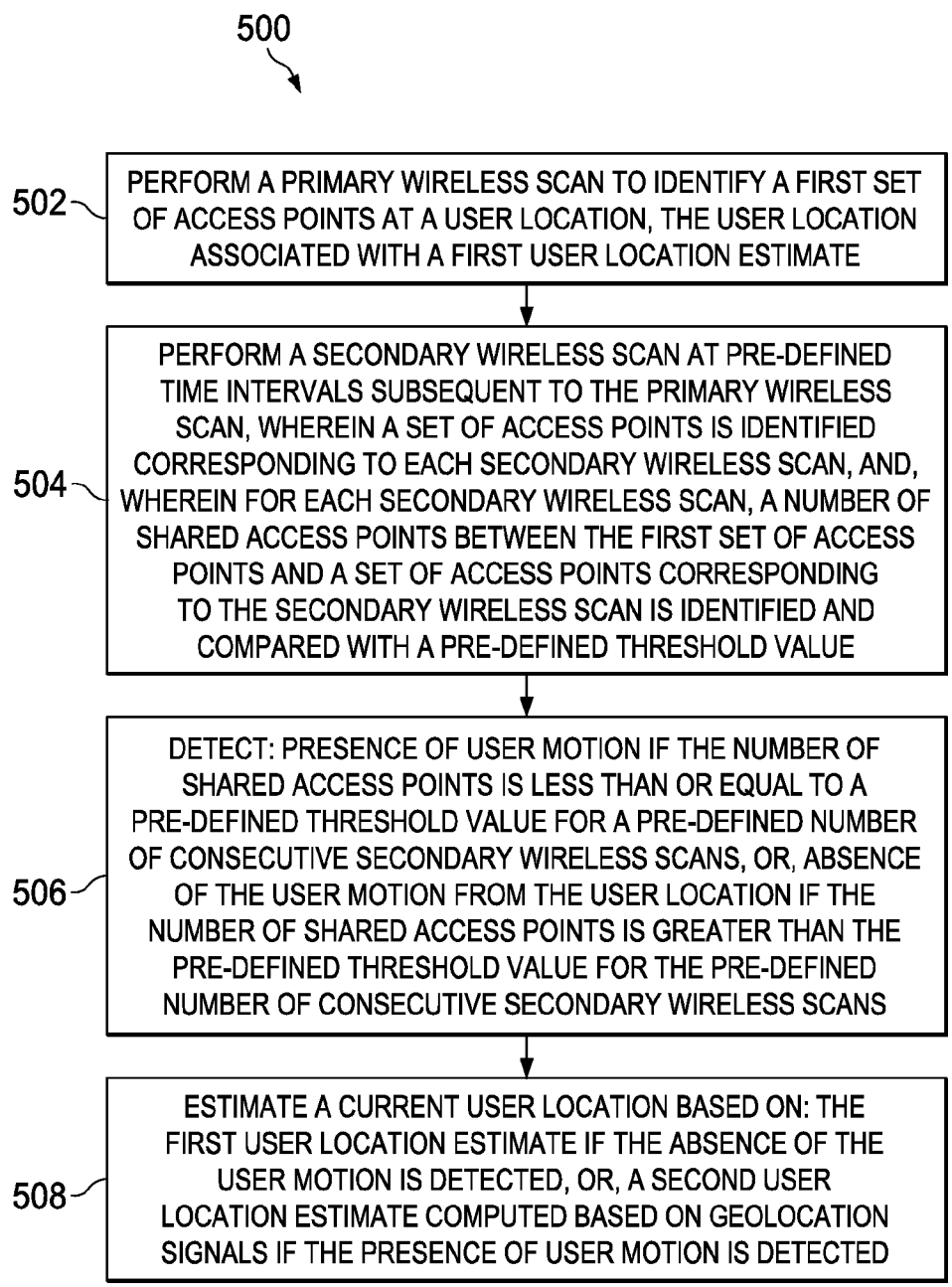
FIG. 5 illustrates a flow diagram of a first example location estimation method in accordance with an example embodiment.

FIG. 5 illustrates a flow diagram of a first example location estimation method 500 (hereinafter referred to as method 500) in accordance with an example embodiment. The method 500 depicted in the flow diagram may be executed by, for example, by a location estimation device including a location estimation system, such as the system 200 explained with reference to FIGS. 2 to 4. Operations of the flowchart, and combinations of operation in the flowchart, may be implemented by, for example, hardware, firmware, a processor, circuitry and/or a different device associated with the execution of software that includes one or more computer program instructions. The operations of the method 500 are described herein with help of the location estimation device. However, the operations of the method 500 can be described and/or practiced by using any device other than the location estimation device. The method 500 starts at operation 502.

At operation 502, a primary wireless scan is performed (for example, with a location estimation device including a transceiver, such as the Wi-Fi scan module 210 of the system 200) to identify a first set of access points at a user location. The user location is associated with a first user location estimate. In an example scenario, the first user location estimate, such as a three-dimensional location estimate of the user may have been previously computed, for example by using triangulation of geolocation signals received from three or more satellites (for example, signals received from GNSS satellites), and as such, the first user location estimate of the user may already be known prior to performing the primary wireless scan. In an embodiment, the first user location estimate may have been computed using Wi-Fi based positioning (for example, using RSSI or TOF measurements from nearby access points), prior to performing the primary wireless scan.

At operation 504, a secondary wireless scan is performed at pre-defined time intervals subsequent to the primary wireless scan (for example, by a location estimation device including a transceiver, such as the Wi-Fi scan module 210 of the system 200). A set of access points is identified corresponding to each secondary wireless scan. In an illustrative example, a pre-defined time interval may be chosen to be ten seconds. It is understood that the pre-defined time interval of ten seconds is included herein for illustration purposes and that the pre-defined time interval may be chosen to be any such time interval based on empirical data. Accordingly, a secondary wireless scans is performed at every ten second interval (for example, at 10, 20, 30 seconds and so on and so forth) from the completion of the primary wireless scan.

In an embodiment, the method 500 further includes detecting a presence of one or more mobile access points (for example, with a location estimation device). As explained with reference to FIG. 2, the term 'mobile access point' refers to a non-stationary access point identified to be present across one or more distant locations. For example, an access point deployed in a vehicle of the user or in one or more other electronic devices associated with the user and functioning as access points and the like may be identified as mobile access points. In an embodiment, the method 500 further includes eliminating the one or more mobile access points from the first set of access points and the set of access points corresponding to the each secondary wireless scan if the one or more mobile access points are detected to be present.

In an embodiment, the method 500 further includes identifying (for example, with the location estimation device) a presence of one or more duplicate entries in the first set of access points and the set of access points corresponding to the each secondary wireless scan, respectively, by disregarding last nibble of media access control (MAC) identification (IDs) during access point identification. As explained with reference to FIG. 2, a same physical access point may advertise multiple MAC IDs, which differ only in their last nibble (e.g. last group of alphanumeric characters from among a plurality of alphanumeric characters configuring MAC IDs). As a result, a same physical access point may be wrongly interpreted as different access points and be included multiple times during wireless scanning. Accordingly, the last nibble of the MAC IDs may be disregarded during wireless scanning, which may result in one or more duplicate entries in the first set of access points as well as in each set of access points identified during one or more secondary wireless scans. In an embodiment, the method 500 further includes coalescing the one or more duplicate entries in the first set of access points and the set of access points corresponding to the each secondary wireless scan, respectively, if the one or more duplicate access points are identified to be present.

In an embodiment, the method 500 further includes identifying (for example, with the location estimation device), for each secondary wireless scan, a number of shared access points between the first set of access points and a set of access points corresponding to each secondary wireless scan. The method 500 further includes comparing the number of shared access points with a pre-defined threshold value.

In an example scenario, the pre-defined threshold value may be chosen based on empirical data associated with various types of environment (for example, indoor environment, outdoor environment, rural environment, urban or semi-urban environment and the like). For example, in areas with high access point density, the pre-defined threshold value may be chosen to be a higher number (for example, two or greater than two), whereas an area with lower access point density, the pre-defined threshold value may be chosen to be a smaller number (for example, zero or one). In an embodiment, the pre-defined threshold value may be determined based on an expected number of mobile access points in the surrounding area.

At operation 506, the method 500 includes detection (for example, with the location estimation device) of: (1) a presence of user motion if the number of shared access points is less than or equal to the pre-defined threshold value for a pre-defined number of consecutive secondary wireless scans, or (2) an absence of the user motion from the user location if the number of shared access points is greater than the pre-defined threshold value for the pre-defined number of consecutive secondary wireless scans. The detection of user motion based on the comparison of the shared number of access points and the pre-defined threshold value may be performed as explained with reference to an illustrative example in FIG. 3 and is not explained herein.

In an embodiment, the method 500 further includes computing (for example, by the location estimation device), for each secondary wireless scan, a difference in received signal strength indication (RSSI) measurements between the first set of access points and a set of access points corresponding to the each secondary wireless scan to assist in detection of the user motion with finer resolution. For example, in addition to the number of shared access points, a difference in RSSI (or time of flight or TOF) measurements may be computed to assist in detection of user motion. For example, if an RSSI measurement received from an access point is observed to be decreasing over consecutive secondary wireless scans, then it may be deduced that the user is moving away from the access point and accordingly, user motion may be detected with greater granularity based on difference in RSSI measurements.

At operation 508, a current user location is estimated (for example, by the location estimation device) based on (1) the first user location estimate if the user motion is detected to be absent, or (2) a second user location estimate computed based on geolocation signals (such as for example, global navigation satellite system (GNSS) signals) if the user motion is detected to be present. More specifically, the initially computed first user location estimate is propagated if the presence of user motion is detected to be absent. Accordingly, a location of the user may be estimated to be user location associated with the first user location estimate. The one or more applications in the electronic device and/or in the location estimation device may utilize the estimated location of the user for triggering one or more specific actions at an application level upon a user's arrival at, or, departure from, areas of interest. However, if a presence of the user motion to a new user location is detected, then a second user location estimate may be computed (for example, by the location estimation device) based on geolocation signals received at the new user location. For example, if it is determined that the user has moved from the floor 106 to the street 116 depicted in the environment 100 in FIG. 1, then the second user location estimate may be estimated based on the received geolocation signals at the user location on the street 116.

In an embodiment, the method 500 further includes detecting if a difference between the second user location estimate and the first user location estimate (also referred to herein as the new user location estimate and the old user location estimate, respectively) is greater than a pre-defined distance threshold. In an embodiment, the subsequent user motion is detected based on the difference between the new user location estimate and the old user location estimate. In an embodiment, if the difference between the new user location estimate and the old user location estimate is greater than the pre-defined distance threshold, implying that the user is moving with a higher velocity, then the subsequent user motion detection is performed based on geolocation signals with associated periodicity to detect subsequent user motion. In an example embodiment, the periodicity may be one-minute interval, implying a satellite scan every minute to receive geolocation signals from the satellites. The user locations may be computed at every minute to check for presence of user movement from the previously computed user location to detect subsequent user motion.

In an embodiment, if the difference between the new user location estimate and the old user location estimate is less than or equal to the pre-defined distance threshold, implying, that the user is either stationary or moving with a relatively lower velocity, then the subsequent user motion is detected based on Wi-Fi signals with associated periodicity. In an example embodiment, the periodicity associated with the Wi-Fi signals may be 15 seconds interval, implying a wireless scan every 15 seconds to receive Wi-Fi signals from nearby access points. The detection of the subsequent user motion may be performed based on periodic repeating of the steps of performing the primary wireless scan, performing the secondary wireless scans and detecting one of the presence and the absence of the subsequent user motion. The detection of subsequent user motion may be performed as explained with reference to an illustrative example in FIG. 4 and is not explained herein for sake of brevity.

In an embodiment, the method 500 further includes determining an average velocity estimate associated with the subsequent user motion. In an embodiment, a periodicity of one of the Wi-Fi signals based user motion detection and the geolocation signals based user motion detection is chosen based on the average velocity estimate. In an embodiment, the method 500 includes receiving sensor indications of user movement at the user location and triggering the performing of the primary wireless scan at the user location. For example, an indication of user movement may be received from an accelerometer if the acceleration is greater than a preset threshold value. The indication of user movement may trigger the primary wireless scanning to identify the first set of access points. The sensor assisted wireless scanning for user motion detection enables the wireless scans to be performed with a higher periodicity thereby further improving a power consumption of the location estimation device. Another example method of location estimation is explained with reference to FIGS. 6A and 6B.

Figure 6A:
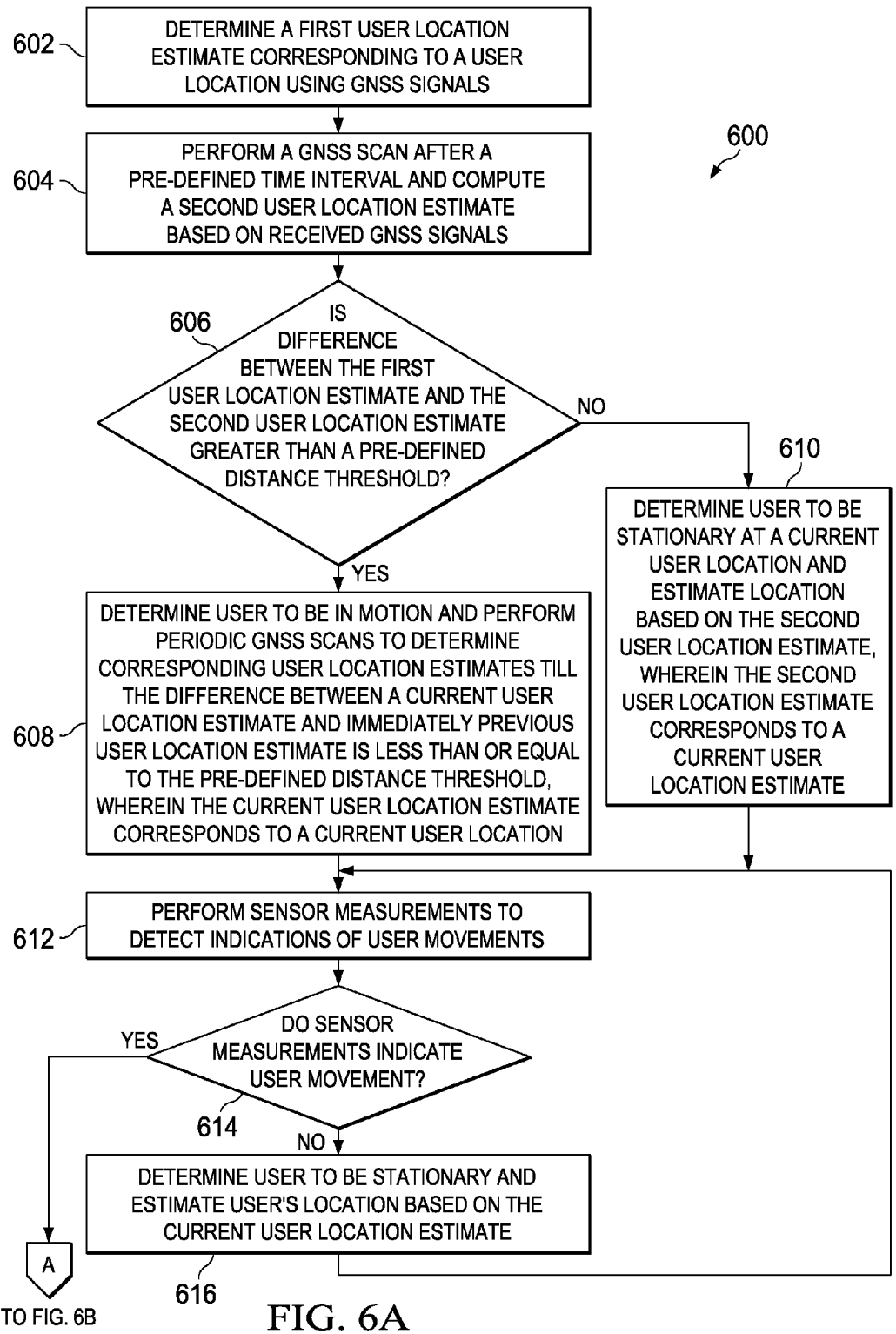
FIGS. 6A and 6B illustrate a flow diagram of a second example location estimation method in accordance with an example embodiment.
Figure 6B:
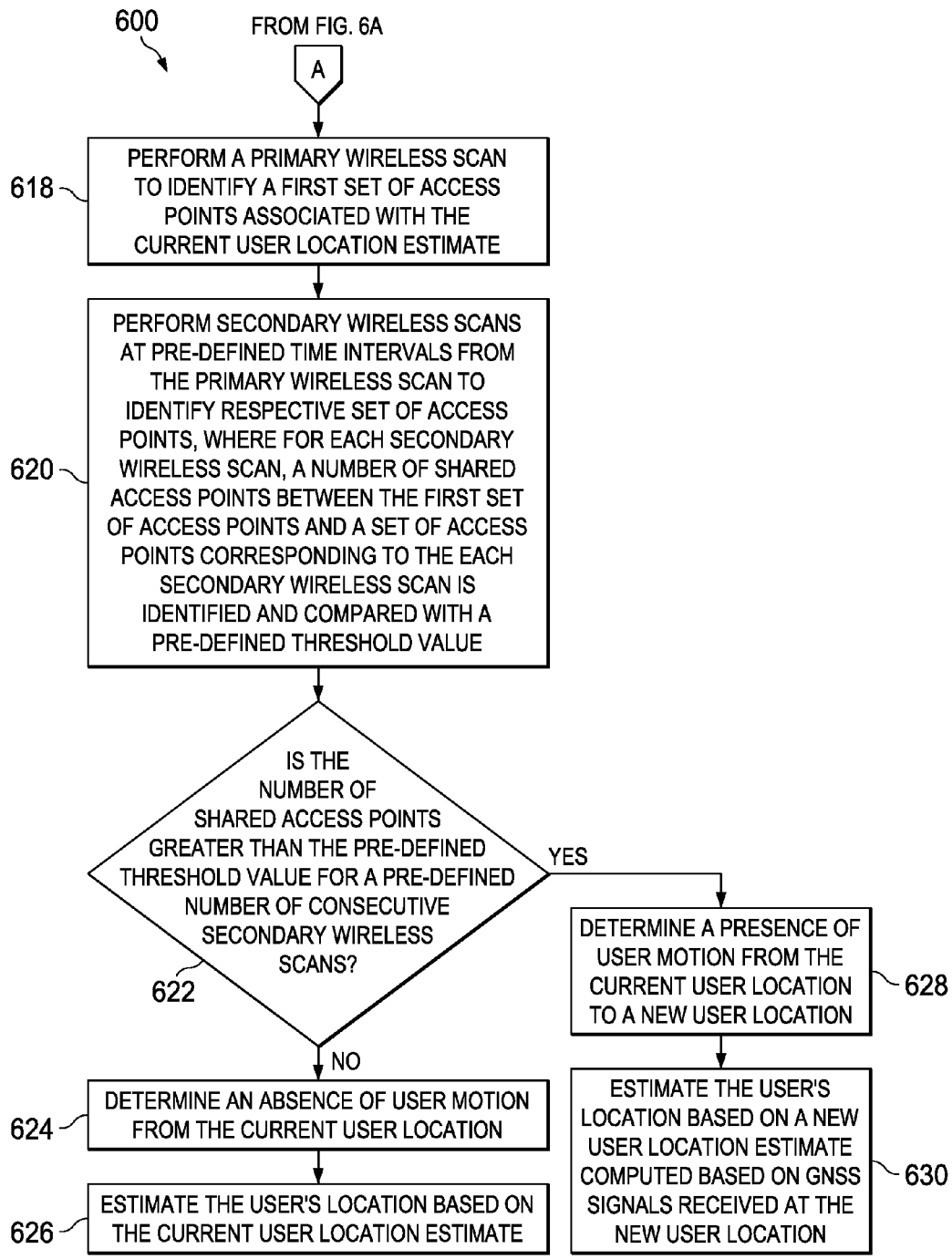

FIGS. 6A and 6B illustrate a flow diagram of a second example location estimation method 600 (hereinafter referred to as method 600) in accordance with an example embodiment. The method 600 depicted in the flow diagram may be executed by, for example, with a location estimation device including a location estimation system, such as the system 200 explained with reference to FIGS. 2 to 4. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the location estimation device. However, the operations of the method 600 can be described and/or practiced by using any device other than the location estimation device. The method 600 starts at operation 602.

At operation 602, a first user location estimate is determined corresponding to a user location using GNSS signals (for example, with the location estimation device using a location determination module, such as the geolocation determination module 216 of the system 200). It is understood that the first user location estimate may be computed using standard techniques such as, for example, using triangulation of GNSS signals received from three or more GNSS satellites. At operation 604, a GNSS scan after a pre-defined time interval is performed (for example, with the location estimation device using a geolocation motion detector, such as the geolocation motion detector 214 of the system 200) and a second user location estimate is computed based on received GNSS signals. At operation 606, a difference between the first user location estimate and the second user location estimate is compared with a pre-defined distance threshold. The pre-defined distance threshold may be chosen to be any number based on empirical data. For example, the pre-defined threshold value may be chosen to be 100 meters as explained with reference to an illustrative example in FIG. 4.

If it is determined that the difference between the first user location estimate and the second user location estimate is greater than the pre-defined distance threshold, then operation 608 is performed. At operation 608, the user is determined to be in motion if the difference between the first user location estimate and the second user location estimate is greater than the pre-defined distance threshold. Further at operation 608, periodic GNSS scans are performed to determine corresponding user location estimates till the difference between a current user location estimate (corresponding to a current user location) and immediately previous user location estimate is less than or equal to the pre-defined distance threshold. Upon determining that a difference between the current user location estimate and the immediately previous user location estimate is less than or equal to the pre-defined distance threshold, it is determined that the user is stationary and operation 612 is performed thereafter.

If it is determined that the difference between the first user location estimate and the second user location estimate is less than or equal to the pre-defined distance threshold, then operation 610 is performed. At operation 610, the user is determined to be stationary at a current user location if the difference between the first user location estimate and the second user location estimate is lesser than the pre-defined distance threshold. Further, at operation 610, user's location is estimated based on the second user location estimate and the second user location estimate is hereinafter propagated as a current user location estimate. Subsequently, operation 612 is performed.

At operation 612, sensor measurements are performed (for example, with the location estimation device using a sensor device such as the sensor module 208 of the system 200) to detect indications of user movements from the current user location estimate. At operation 614, indications of user movements based on sensor measurements are determined. If no indications of user movements are determined from the sensor measurements, then the operation 616 is performed. At operation 616, the user is determined to be stationary and the user's location is estimated based on the current location estimate. Thereafter, operations 612 and 614 are repeated till the indications of user movements are determined at operation 614. If indications of user movements are determined from the sensor measurements, then operation 618 is performed. At operation 618, a primary wireless scan is performed (for example, with the location estimation device, using a transceiver, such as the Wi-Fi scan module 210) to identify a first set of access points associated with the current user location estimate. At operation 620, secondary wireless scans are performed at pre-defined time intervals subsequent to the primary wireless scan (for example, by the location estimation device, using a transceiver, such as the Wi-Fi scan module 210) to identify respective set of access points. For each secondary wireless scan, a number of shared access points between the first set of access points and a set of access points corresponding to the each secondary wireless scan is identified and compared with a pre-defined threshold value (for example, with the location estimation device).

At operation 622, it is determined whether the number of shared access points is greater than the pre-defined threshold value for a pre-defined number of consecutive secondary wireless scans. If is determined that the number of shared access points is not greater than the pre-defined threshold value for a pre-defined number of consecutive secondary wireless scans, then operation 624 is performed. At operation 624, an absence of user motion from the current user location is determined. Thereafter, at operation 626, the user's location is estimated based on the current user location estimate. If is determined that the number of shared access points is greater than the pre-defined threshold value for a pre-defined number of consecutive secondary wireless scans, then operation 628 is performed. At operation 628, a presence of user motion from the current user location to a new user location is determined. At operation 630, the user's location is estimated based on a new user location estimate computed based on GNSS signals received at the new user location.

As explained with reference to FIG. 2, techniques of user motion detection based on access point visibility during successive wireless scans may be extended to other applications such as tracking of assets like objects stored in a warehouse and the like. A method for estimating a location of an object based on object motion detection is explained with reference to FIG. 7.

Figure 7:
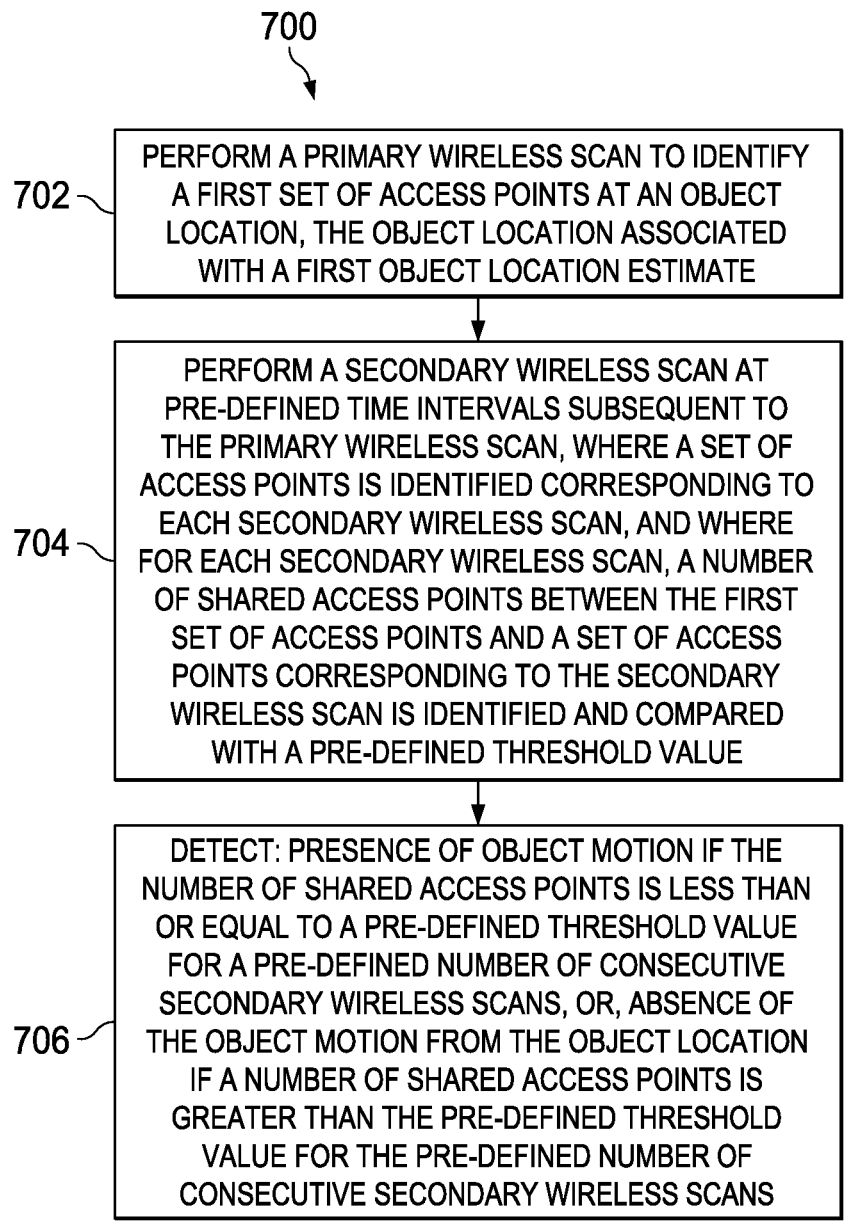
FIG. 7 illustrates a flow diagram of a method for estimating a location of an object based on object motion detection in accordance with an example embodiment.

FIG. 7 illustrates a flow diagram of a method 700 for estimating a location of an object based on object motion detection in accordance with an example embodiment. The method 700 depicted in the flow diagram may be executed by, for example, by an electronic device including a location estimation device, such as the system 200 explained with reference to FIGS. 2 to 4. In such a case, the electronic device may be embodied as a physical device including components of the system 200 explained with reference to FIG. 2 and such a device may be tagged with objects, whose motion is to be tracked for location estimation purposes. Operations of the flowchart, and combinations of operation in the flowchart, may be implemented by, for example, hardware, firmware, a processor, circuitry and/or a different device associated with the execution of software that includes one or more computer program instructions. The operations of the method 700 are described herein with help of the electronic device. However, the operations of the method 700 can be described and/or practiced by using any device other than the electronic device. For example, tags including components such as those included in the system 200 may be affixed with objects to be tracked for location estimation purposes. Further, the term 'object' as used herein may refer to any physical good, whose location is to be tracked. For example, a location of physical good or object stored in a warehouse may need to be continuously ascertained for theft or pilferage reasons. Accordingly, a presence of motion (or lack of motion therefrom) is checked for objects for corresponding location estimation purposes. The method 700 starts at operation 702.

At operation 702, a primary wireless scan is performed (for example, with an electronic device including a transceiver, such as the Wi-Fi scan module 210 of the system 200) to identify a first set of access points at an object location. The object location is associated with a first object location estimate (for example, a location of a warehouse storing the object). In an example scenario, the first object location estimate, such as a three-dimensional location estimate of the warehouse may have been previously computed, for example by using triangulation of geolocation signals received from three or more satellites (for example, signals received from GNSS satellites), and as such, the first object location estimate of the object (i.e. the warehouse) may already be known prior to performing the primary wireless scan. In an embodiment, the first object location estimate may have been computed using Wi-Fi based positioning (for example, using RSSI or TOF measurements from nearby access points), prior to performing the primary wireless scan. In an embodiment, the first object location estimate may just be a reference location (for example, can be taken as the origin), as changes from the reference location may be of interest than the absolute location itself.

At operation 704, a secondary wireless scan is performed at pre-defined time intervals subsequent to the primary wireless scan (for example, by the electronic device including a transceiver, such as the Wi-Fi scan module 210 of the system 200). A set of access points is identified corresponding to each secondary wireless scan. In an illustrative example, a pre-defined time interval may be chosen to be ten seconds. It is understood that the pre-defined time interval of ten seconds is included herein for illustration purposes and that the pre-defined time interval may be chosen to be any such time interval based on empirical data. Accordingly, a wireless scan is performed at every ten second interval (for example, at 10, 20, 30 seconds and so on and so forth) from the completion of the primary wireless scan.

In an embodiment, the method 700 further includes detecting a presence of one or more mobile access points and eliminating the one or more mobile access points from the first set of access points and the set of access points corresponding to the each secondary wireless scan if the one or more mobile access points are detected to be present. In an embodiment, the method 700 further includes identifying a presence of one or more duplicate entries in the first set of access points and the set of access points corresponding to the each secondary wireless scan, respectively, by disregarding last nibble of media access control (MAC) identification (IDs) during access point identification. Further, the method 700 further includes coalescing the one or more duplicate entries in the first set of access points and the set of access points corresponding to the each secondary wireless scan, respectively, if the one or more duplicate access points are identified to be present.

In an embodiment, the method 700 further includes identifying (for example, with the location estimation device), for each secondary wireless scan, a number of shared access points between the first set of access points and a set of access points corresponding to each secondary wireless scan. The method 700 further includes comparing the number of shared access points with a pre-defined threshold value. In an example scenario, the pre-defined threshold value may be chosen based on empirical data associated with various types of environment as explained with reference to FIG. 5.

At operation 706, the method 700 includes detection (for example, with the electronic device) of: (1) a presence of object motion if the number of shared access points is less than or equal to the pre-defined threshold value for a pre-defined number of consecutive secondary wireless scans, or (2) an absence of the object motion from the object location if the number of shared access points is greater than the pre-defined threshold value for the pre-defined number of consecutive secondary wireless scans. The detection of object motion based on the comparison of the shared number of access points and the pre-defined threshold value may be performed as explained with reference to an illustrative example in FIG. 3 and is not explained herein. Detecting the absence or presence of motion of the object may enable ascertaining the location of the object and as such may help in tracking of assets.

Without in any way limiting the scope, interpretation, or application of the claims appearing below, advantages of one or more of the example embodiments disclosed herein include low-power estimation of location of users/objects. Accordingly, Wi-Fi signals and geolocation signals based positioning are collectively utilized in location estimation. More specifically, Wi-Fi scans are used to determine if the user has moved or not. This is then used to modulate the call to geolocation determination module for location estimation. This decreases power consumption significantly in indoor pedestrian and stationary conditions. This is especially useful for handheld device applications like location based advertising, social networking, reminder services and the like, which are configured to be executed continuously at the application layer backend for monitoring a user's locations and trigger specific actions at an application level upon a user's arrival at, or, departure from, areas of interest. Further techniques disclosed herein facilitate sensor assisted wireless scanning for user motion detection, which in turn enables the wireless scans to be performed with a lower periodicity thereby further improving a power consumption of the electronic devices. Furthermore, the methods and systems disclosed herein do not necessitate a provision of an access point database for location estimation, thereby precluding additional deployment cost. Further, the methods and systems may be implemented without requiring host intervention. Also, the methods and systems disclosed herein are configured to discriminate user motion at granularity of static/low motion versus high rate motion and provide power conservation (for example, better power conservation than sensor based motion detectors). In some example scenarios, the power consumption is less than 1 mA compared to nearly 20 mA when GNSS based location estimation is utilized alone for estimating a user's location. Moreover, the location estimation techniques as disclosed herein may be used in a variety of applications, such as geofencing applications (e.g., tracking of goods/products in transit etc.). In some embodiments, the geolocation signals based location estimation may be precluded and Wi-Fi based motion detection as disclosed herein may be utilized to check on illegal movement of goods in storage, such as a warehouse and to implement corrective actions as explained with reference to FIG. 7.

Although the present technology has been described with reference to specific example embodiments, it is noted that various modifications and changes may be made to these embodiments without departing from the broad spirit and scope of the present technology. For example, the various devices, modules etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods may be embodied using transistors, logic gates, and electrical circuits (for example, application specific integrated circuit (ASIC) circuitry and/or in Digital Signal Processor (DSP) circuitry). Particularly, the system 200, the Wi-Fi module 202, the geolocation module 204, the controller module 206 and the sensor module 208 may be enabled using software and/or using transistors, logic gates, and electrical circuits (for example, integrated circuit circuitry such as ASIC circuitry).

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the example embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these example embodiments, it is noted that certain modifications, variations, and alternative constructions may be apparent and well within the spirit and scope of the technology. Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A location estimation method comprising:
    (a) performing a primary wireless scan to identify a first set of access points at a user location, the user location associated with a first user location estimate;
    (b) performing a secondary wireless scan at pre-defined time intervals subsequent to the primary wireless scan, a set of access points is identified corresponding to each secondary wireless scan, and for each secondary wireless scan, a number of shared access points is identified and compared with a pre-defined threshold value, a shared access point being an access point identified to be present in the first set of access points and the set of access points corresponding to the secondary wireless scan;
    (c) detecting with a location estimation device:
        a presence of user motion if the number of shared access points is less than or equal to the pre-defined threshold value for a pre-defined number of consecutive secondary wireless scans, or
        an absence of the user motion from the user location if the number of shared access points is greater than the pre-defined threshold value for the pre-defined number of consecutive secondary wireless scans;
    (d) estimating a current user location with the location estimation device, based on:
        the first user location estimate if the absence of the user motion is detected, or
        a second user location estimate computed based on geolocation signals if the presence of the user motion is detected;
    (e) detecting, with the location estimation device, if a difference between the second user location estimate and the first user location estimate is greater than a pre-defined distance threshold; and
    (f) detecting subsequent user motion, with the location estimation device, based on:
        Wi-Fi signals if the difference between the second user location estimate and the first user location estimate is less than or equal to the pre-defined distance threshold, or
        geolocation signals if the difference between the second user location estimate and the first user location estimate is greater than the pre-defined distance threshold.

2. The method of claim 1 including:
    detecting a presence of one or more mobile access points, in which a mobile access point corresponds to a non-stationary access point identified to be present across one or more distant locations; and
eliminating the one or more mobile access points from the first set of access points and the set of access points corresponding to the secondary wireless scan if the one or more mobile access points are detected to be present.

3. The method of claim 1 including:
identifying a presence of one or more duplicate entries in the first set of access points and the set of access points corresponding to the secondary wireless scan, respectively, by disregarding last nibble of media access control (MAC) identification (ID) during access point identification; and
coalescing the one or more duplicate entries in the first set of access points and the set of access points corresponding to the secondary wireless scan, respectively, if the one or more duplicate access points are identified to be present.

4. The method of claim 1 including determining an average velocity estimate associated with the subsequent user motion by the location estimation device, in which a periodicity of one of the Wi-Fi signals based subsequent user motion detection and the geolocation signals based subsequent user motion detection is chosen based on the average velocity estimate.

5. The method of claim 1 in which for each secondary wireless scan, a difference in received signal strength indication (RSSI) measurements between the first set of access points and the set of access points corresponding to the secondary wireless scan is computed to assist in detection of the user motion with finer resolution.

6. The method of claim 1 including:
receiving sensor indications of user movement at the user location; and
triggering the performing of the primary wireless scan upon receiving the sensor indications of the user movement.

7. The method of claim 1 in which the first user location estimate corresponding to the user location is computed with the location estimation device based on geolocation signals received at the user location.

8. A location estimation system comprising:
(a) a Wi-Fi module including a Wi-Fi scan module configured to perform:
a primary wireless scan to identify a first set of access points at a user location, the user location associated with a first user location estimate, and
a secondary wireless scan at pre-defined time intervals subsequent to the primary wireless scan, a set of access points is identified corresponding to each secondary wireless scan, and
a Wi-Fi motion detector communicatively associated with the Wi-Fi scan module and configured to identify a number of shared access points for each secondary wireless scan, a shared access point being an access point identified to be present in the first set of access points and the set of access points corresponding to the secondary wireless scan, the Wi-Fi motion detector further configured to compare the number of shared access points with a pre-defined threshold value to thereby identify:
a presence of user motion if the number of shared access points is less than or equal to the pre-defined threshold value for a pre-defined number of consecutive secondary wireless scans, or
an absence of the user motion from the user location if the number of shared access points is greater than the pre-defined threshold value for the pre-defined number of consecutive secondary wireless scans;
(b) a geolocation module communicatively associated with the Wi-Fi module and comprising a geolocation determination module, the geolocation determination module configured to estimate a current user location based on:
the first user location estimate if the absence of the user motion is detected, or
a second user location estimate computed based on geolocation signals if the presence of the user motion is detected;
(c) a controller module communicatively associated with the Wi-Fi module and the geolocation module, the controller module configured to:
detect if a difference between the first user location estimate and the second user location estimate is greater than a pre-defined distance threshold; and
facilitate detection of subsequent user motion by selecting:
the Wi-Fi motion detector if the difference between the second user location estimate and the first user location estimate is less than or equal to the pre-defined distance threshold, or
a geolocation motion detector associated with the geolocation module if the difference between the second user location estimate and the first user location estimate is greater than the pre-defined distance threshold.

9. The system of claim 8 in which the Wi-Fi motion detector is further configured to:
detect a presence of one or more mobile access points, wherein a mobile access point corresponds to a non-stationary access point identified to be present across one or more distant locations; and
eliminate the one or more mobile access points from the first set of access points and the set of access points corresponding to the secondary wireless scan if the one or more mobile access points are detected to be present.

10. The system of claim 8 in which the Wi-Fi motion detector is further configured to:
identify a presence of one or more duplicate entries in the first set of access points and the set of access points corresponding to the secondary wireless scan, respectively, by disregarding last nibble of media access control (MAC) identification (ID) during access point identification; and
coalesce the one or more duplicate entries in the first set of access points and the set of access points corresponding to the secondary wireless scan, respectively, if the one or more duplicate access points are identified to be present.

11. The system of claim 8 in which the geolocation motion detector is further configured to determine an average velocity estimate associated with the subsequent user motion in which a periodicity of one of the Wi-Fi motion detector and the geolocation motion detector is chosen based on the average velocity estimate.

12. The system of claim 8 in which Wi-Fi motion detector is further configured to compute, for each secondary wireless scan, a difference in received signal strength indication (RSSI) measurements between the first set of access points and the set of access points corresponding to the secondary wireless scan to assist in detection of the user motion with finer resolution.

13. The system of claim 8 including a sensor module configured to provision sensor indications of user movement at the user location for triggering the performing of the primary wireless scan at the user location.

14. The system of claim 8 in which the first user location estimate corresponding to the user location is computed by the geolocation determination module based on geolocation signals received at the user location.

15. The system of claim 8 in which the system is at least partially embodied as an integrated circuit.

\* \* \* \* \*